(12) United States Patent
Dunand et al.

(10) Patent No.: US 10,309,569 B2
(45) Date of Patent: Jun. 4, 2019

(54) DEVICE AND METHOD FOR INTERVENING ON A BRANCH OF A FLUID CONDUIT

(71) Applicant: GRDF, Paris (FR)

(72) Inventors: Christophe Dunand, Maure de Bretagne (FR); Jacques Sculteur, Rennes (FR)

( * ) Notice: Subject to any disclaimer, the term of this patent is extended or adjusted under 35 U.S.C. 154(b) by 60 days.

(21) Appl. No.: 15/537,417

(22) PCT Filed: Dec. 18, 2015

(86) PCT No.: PCT/FR2015/053661
§ 371 (c)(1),
(2) Date: Jun. 18, 2017

(87) PCT Pub. No.: WO2016/097660
PCT Pub. Date: Jun. 23, 2016

(65) Prior Publication Data
US 2018/0266609 A1    Sep. 20, 2018

(30) Foreign Application Priority Data

Dec. 18, 2014 (FR) ...................................... 14 62799

(51) Int. Cl.
*F16L 41/04* (2006.01)
*F16L 55/115* (2006.01)
*F16L 55/10* (2006.01)

(52) U.S. Cl.
CPC ............... *F16L 41/04* (2013.01); *F16L 55/10* (2013.01); *F16L 55/115* (2013.01); *F16L 55/1152* (2013.01)

(58) Field of Classification Search
CPC ...... F16L 41/04; F16L 55/115; F16L 55/1152; F16L 55/10
See application file for complete search history.

(56) References Cited

U.S. PATENT DOCUMENTS

| 4,573,628 A * | 3/1986 | Dohlen et al. | .......... F16L 41/04 137/15.14 |
| 2012/0318926 A1* | 12/2012 | Ingham et al. | .......... B64G 1/12 244/159.4 |

* cited by examiner

*Primary Examiner* — Kevin L Lee
(74) *Attorney, Agent, or Firm* — Patshegen IP LLC; Moshe Pinchas

(57) ABSTRACT

A device (130) and method for intervening on a branch of a fluid conduit (20), the device comprising:
  a removable flange (105) comprising:
    two portions (110, 115) linked by a removable junction (120) having, when the two portions are linked, an opening surrounding the branch and
    a lock (130) for locking the flange around the branch such that the opening sealingly surrounds the branch,
  an inflatable airlock (135) comprising:
    an inflatable body (140) having at least one inflatable protuberance (145) and
    an attacher (150) for sealed attachment to the flange.

12 Claims, 2 Drawing Sheets

DEVICE AND METHOD FOR INTERVENING ON A BRANCH OF A FLUID CONDUIT

TECHNICAL FIELD OF THE INVENTION

The present invention envisages a device for intervening on a branch of a fluid conduit and a method for intervening on a branch of a fluid conduit. It applies, in particular, to the elimination of taps in gas conduits.

STATE OF THE ART

In the field of low-pressure gas conduits, some conduits currently installed in gas distribution facilities have direct taps with a lead outlet. These direct taps are considered a risk factor and, especially in France, must be eliminated by the operators of gas distribution networks.

In some current systems, several earthwork holes are dug in the soil around the tap to uncover a segment of the gas conduit upstream and a segment of the gas conduit downstream from the tap to be eliminated. Then a branch is realized for the gas in the conduit such that the gas flow no longer passes through the portion of the conduit comprising the tap. The tap is then eliminated by affixing a cap over an opening of the tap. Finally, the bypass is removed.

The drawbacks of these systems are that:
- they require the use of four flow-stop bagging systems to sealingly realize the bypass;
- they require the intervention of two operators for several hours, one of these operators being a qualified welder;
- carrying out such an intervention on a tap is costly;
- they have a heavy environmental impact because three holes have to be made in the public roadway; and
- they require the temporary interruption of the gas distribution through this conduit.

In other current systems, a resin is molded around the direct tap, and this tap is crushed and burred.

The drawbacks of these systems are that:
- they require a long preparation time before molding, in particular because the tap requires cleaning by an operator;
- an appendix several centimeters long is left because of the crushing and burring of the tap;
- they require an intervention of several hours; and
- they have an environmental risk due to possible fluid leaks following the molding.

In particular, systems are known such as those described in document JP 2006334707. This document describes a device for cutting out a main gas conduit in order to attach a secondary conduit to the opening cut out in this way. Therefore, the device shown in FIGS. 9 to 12 utilizes the following method:
- a branch conduit is positioned opposite the location where the opening will be pierced in the main conduit, no gas passing through the branch conduit at that time;
- the branch conduit is opened;
- an airlock is positioned on the branch conduit;
- the main conduit is pierced by the opening of the branch conduit;
- the opening of the main conduit is blocked with a temporary plug;
- the branch conduit and the airlock are removed at the same time; and
- the secondary conduit is attached to the main conduit.

It is apparent from this method that, due to the structure of the device for attaching the airlock to the branch conduit and the purpose of the latter, the utilization of such a device is not suitable for a branch conduit travelled by the gas because the branch conduit must be open before the airlock is positioned which, in the case of a conduit travelled by gas, leads to a release of gas.

For all these reasons, there is currently no satisfactory system for removing a tap from a gas, and more generally, any fluid conduit.

SUBJECT OF THE INVENTION

The present invention aims to remedy all or part of these drawbacks.

To this end, according to a first aspect, the present invention envisages a device for intervening on a branch of a fluid conduit, which comprises:
- a removable flange comprising:
  - two portions linked by a removable junction having, when the two portions are linked, an opening surrounding the branch; and
  - a locking means for locking the flange around the branch such that the opening sealingly surrounds the branch;
- an inflatable airlock comprising:
  - an inflatable body having at least one inflatable protuberance; and
  - a means for sealed attachment to the flange.

Thanks to these provisions, digging one trench, at the point of interest on the fluid conduit, is sufficient. In addition, only one operator is required to set up such an intervention device. The device that is the subject of the present invention reduces the intervention cost compared to the known systems, as well as the intervention time. In addition, these provisions make it possible to carry out an intervention on a branch at temperatures between −5° C. and 30° C., unlike the systems of the prior state of the art, which do not operate at a negative temperature.

In some embodiments, the device that is the subject of the present invention is utilized to remove a branch of a fluid conduit, the device comprising a means for attaching a cap closing an opening of the branch, the cap and the attachment means being positioned in the inflatable airlock before the airlock is attached to the flange.

These embodiments make it possible to remove a branch with the cap and attachment means present inside the inflated airlock. This cap and attachment means are grasped by inserting an operator's hand into each protuberance of the inflatable airlock. Operation of the tools and necessary parts is therefore made easier.

In some embodiments, the flange comprises a valve passing through one portion of the flange to inflate or empty an inflatable airlock when the valve is open.

The advantage of these embodiments is that they make it possible to inflate the inflatable airlock before carrying out the intervention on the branch, for example by using a pump or a cylinder of pressurized air, such that the fluid passing through the conduit enters only a little, or not at all, into the inflatable airlock because this inflatable airlock has a pressure lower than or equal to that inside the conduit.

In some embodiments, the device that is the subject of the present invention comprises a means for inserting pressurized air into the airlock at a pressure lower than or equal to the pressure of the conduit's fluid.

These embodiments prevent fluid from exiting by the branch while the intervention is carried out.

In some embodiments, the airlock is inflated to a pressure lower than or equal to 50 mbar.

The advantage of these embodiments is that they make it possible to intervene on conduits known as "low pressure" conduits, ie with a pressure of less than 50 mbar.

In some embodiments, the locking means comprises a means for clamping one portion of the flange to the other portion.

These embodiments make it possible to reinforce the sealing of the airlock around the branch so as to avoid fluid leaks while the intervention is carried out on the branch.

In some embodiments, the inflatable airlock is transparent.

The advantage of these embodiments is that they allow an operator to see through the wall of the airlock, which makes it much easier to operate objects inside the airlock.

In some embodiments, the flange comprises a rigid base, for parts and/or tools for the intervention.

These embodiments have the advantage of allowing tools and/or parts to be deposited while the intervention is carried out, to avoid the risks of the airlock being pierced by the tools and/or parts.

According to a second aspect, the present invention envisages a method for intervening on a branch of a fluid conduit, which comprises:
- a step of attaching a removable flange comprising:
  - a step of connecting two portions linked by a removable junction having, when the two portions are linked, an opening surrounding the branch; and
  - a locking means for locking the flange around the branch such that the opening sealingly surrounds the branch;
- a step of sealingly attaching an inflatable airlock to the flange;
- a step of opening the branch.

In some embodiments, the method that is the subject of the present invention comprises a step of checking that the airlock is sealed, achieved by inflating the airlock.

These embodiments make it possible to detect a risk of a gas leak likely to be dangerous for an operator near the device.

In some embodiments, the method that is the subject of the present invention is utilized for removing the branch, this method comprising:
- before the step of attaching the airlock, a step of depositing a cap and a means for attaching the cap closing an opening of the branch inside the inflatable airlock comprising an inflatable body having two inflatable protuberances, and
- before the step of opening the branch, a step of placing the cap over the opening of the branch.

In some embodiments, the method that is the subject of the present invention comprises a step of inserting pressurized air through a valve passing through the flange to bring the pressure of the airlock below the pressure of the fluid in the conduit.

As the particular aims, advantages and features of the method that is the subject of the present invention are similar to those of the device that is the subject of the present invention, they are not repeated here.

BRIEF DESCRIPTION OF THE FIGURES

Other advantages, aims and particular features of the invention will become apparent from the non-limiting description that follows of at least one particular embodiment of the device and the method that are the subjects of the present invention, with reference to drawings included in an appendix, wherein.

DESCRIPTION OF EXAMPLES OF REALIZATION OF THE INVENTION

The present description is given as a non-limiting example, each characteristic of an embodiment being able to be combined with any other characteristic of any other embodiment in an advantageous way. In addition, each parameter of an example of realization can be utilized independently from the other parameters of said example of realization.

It is now noted that the figures are not to scale.

"Branch" means, in particular, any feeder or connection made in a fluid conduit, for example.

Figure 1:
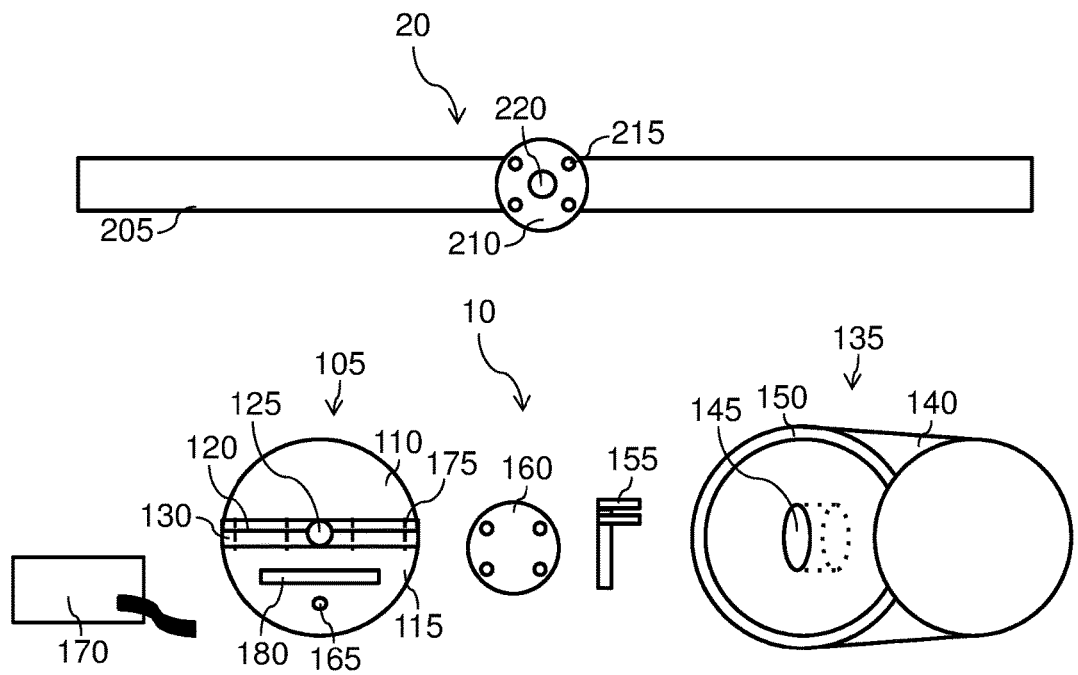
FIG. 1 represents, schematically and in a side view, a particular embodiment of the device that is the subject of the present invention, before assembly with a view to carrying out an intervention.

FIG. 1, which is not to scale, shows an elevation view of an embodiment of the device 10 that is the subject of the present invention. This device 10 for intervening on a branch 221 of a fluid conduit 20 to remove the branch 221 comprises a removable flange 105, an inflatable airlock 135, a means 155 for attaching a cap, and a means 170 for inserting pressurized air into the inflatable airlock 135.

The removable flange 105 comprises:
- two portions, 110 and 115, linked by a removable junction 120 having, when the two portions, 110 and 115, are linked, an opening 125 surrounding the branch 221;
- a means 130 for locking the flange 105 around the branch 221 such that the opening 125 sealingly surrounds the branch 221, the locking means 130 comprising a means 175 for clamping one portion 110 of the flange 105 to the other portion 115;
- a valve 165 passing through one portion of the flange to inflate or empty the inflatable airlock 135 when the valve is open; and
- optionally, a rigid base 180, for parts 160 and/or tools 155 for the intervention, in the form of a box or, as in FIG. 1, having a horizontal surface when the flange 105 is attached to the branch 221.

The inflatable airlock 135 comprises:
- an inflatable body 140 having at least one inflatable protuberance 145; and
- a means 150 for sealed attachment to the flange 105.

The attachment means 155 makes it possible to attach a cap 160 closing an opening 220 of the branch 221, the cap 160 and the attachment means being positioned in the inflatable airlock 140 before attaching the airlock to the flange 105.

The means 170 for inserting pressurized air injects air into the inflatable airlock 135 at a pressure preferably lower than or equal to the pressure of the fluid of the conduit 20.

The flange 105 is, for example, a rigid circular surface, for example metallic or made of a plastic material, formed by two semicircular portions, 110 and 115, the center of this surface being pierced by an opening 125. This opening 125 is sized so as to be able to surround the branch 221 along a plane perpendicular to the main axis of this branch 221.

In this embodiment, the branch 221 comprises an opening 220 surrounded by a surface 210 for attachment to another pipe or to a cap for closing the opening 220. Attachment to another pipe or to a cap is achieved using nuts 215.

The flange 105 is positioned along the branch 221, between this surface 210 and the pipe 205 by opening the junction 120, by positioning the two portions, 110 and 115, around the branch 221 and by locking the portions, 110 and 115, forming the flange 105.

The locking means 130 is, for example, formed from one surface on each portion, 110 and 115, positioned opposite each other when the portions, 110 and 115, are facing each other, and comprising threaded holes for attaching screws. These screws, possibly associated with nuts, form the clamping means, and make it possible to hold the flange 105 in position, and to make the opening 125 sealed around the branch 221.

In some embodiments, as the one shown in FIG. 1, the flange 105 comprises a rigid base 180 for parts 160 and/or tools 155 for the intervention. This rigid base 180 is, for example, a folding surface forming a shelf in the folded-out position. In some variants, this rigid base 180 is a box containing the parts and/or tools for the intervention.

The flange 105 also comprises a valve 165 passing through one portion 115 of the flange 105 to inflate or empty the inflatable airlock 135 when the valve 165 is open. This valve 165 is closed automatically or manually by a closing means (not shown) located on the surface of the flange 105 facing the pipe 105.

The valve 165 serves as the connection with the outlet of the air insertion means 170, this air insertion means 170 being, for example, a cylinder of pressurized air or an air pump. The effect of this air insertion means 170 is to increase the pressure in the inflatable airlock 135 to a positive pressure, preferably lower than or equal to the pressure inside the conduit 205, for example 50 mbar.

In some variants, the device 10 comprises a means for the aspiration of air and fluid (not shown) from inside the inflatable airlock 135, to avoid fluid leaks that may be introduced into the inflatable airlock 135 during the intervention. It is noted that, in some variants, this aspiration means can replace the means for inserting air into the airlock, if it is the pressure of the gas in the conduit that will cause the airlock 135 to be inflated. However, these variants do not have the same level of safety for the operator, if only because residues of gas remain in the airlock after its deflation by aspiration.

The means 155 for attaching a cap 160 is, for example, a ratchet wrench. This ratchet wrench, and the cap 160, are placed inside the inflatable airlock 135 before the inflatable airlock 135 is attached to the flange 105. In this way, the means 155 for attaching a cap 160 and the cap 160 are accessible to an operator in the pressurized environment inside the inflatable airlock 135.

The inflatable body 140 is, for example, an incomplete closed surface made of transparent plastic material. This closed surface has two protuberances 145 allowing the hands and forearms of an operator to be inserted for operating the means 155 for attaching a cap and the cap 160. This closed surface is completed by the attachment means 150 to define a volume in which a fluid can be stored, this volume forming the inflatable airlock.

The inflatable airlock 135 comprises the means for attachment 150 to the flange 105. This attachment means 150 is, for example, a set of clips assembled by rotation to spurs (not shown) of the flange 105. These clips are mounted on a rigid frame whose shape is complementary to the shape of the flange 105. The attachment means 150 sealingly attaches the inflatable airlock 135 to the flange 105.

In this way, as can be seen by reading the description given above, the flange 105 is positioned sealingly around the branch 221. Then, the means 155 for attaching a cap 160 and the cap 160 are positioned inside the inflatable airlock 135. This inflatable airlock 135 is attached sealingly to the flange 105 and inflated by the air insertion means 170. The operator will carry out his intervention, then remove the device, possibly after aspiration of the contents of the inflatable airlock 135.

In a variant, inflation is achieved by a limited opening of the branch 221 so that the fluid of the pipe enters the volume of the airlock.

Inflation, using air or the fluid of the pipe, makes it possible to check that the inflatable airlock 135 is sealed.

Figure 2:
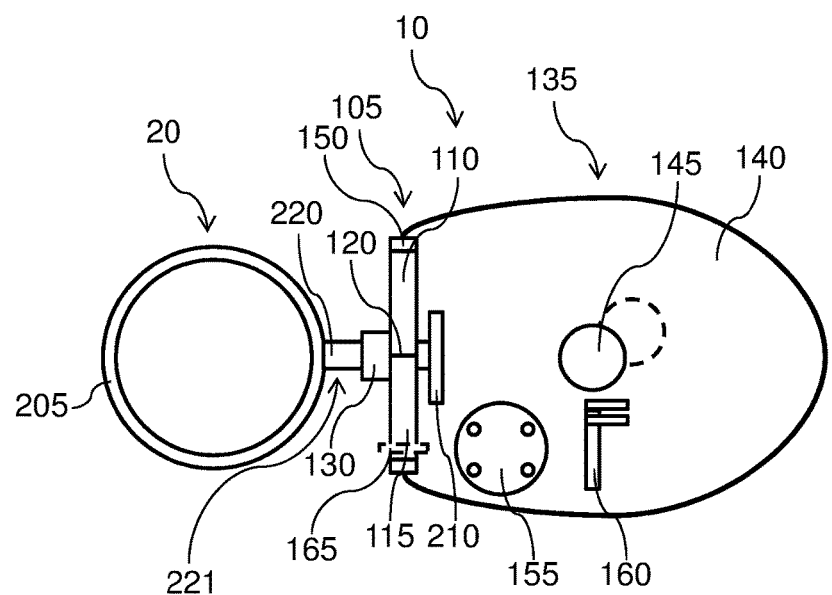
FIG. 2 represents, schematically and in a profile view, the particular embodiment of the device that is the subject of the present invention shown in FIG. 1, during an intervention.

FIG. 2 shows, schematically and in a profile view, a particular embodiment of the device 10 that is the subject of the present invention. This device 10 corresponds to the device 10 described with regard to FIG. 1, the device 10 being assembled around the branch 221 to eliminate a direct tap with a lead outlet (not shown).

It shows, in particular, in cross-section, the conduit 20 comprising a pipe 205 with a circular cross-section. A branch 221 of the pipe 205 comprises an offset opening 220 of the pipe 205 by a conduit. This opening 220 is surrounded by a surface 210 for attaching a cap or another connection pipe.

The conduit connecting the opening 220 and the pipe 205 is surrounded by the flange 105, one portion 110 of the flange 105 being positioned above the conduit, and one portion 115 of the flange 105 being positioned under the conduit. The junction 120 between the two portions, 110 and 115, has an opening (not shown) surrounding the conduit sealingly.

The inflatable airlock 135 is attached to the flange 105 by the attachment means 150, similar to the attachment means 150 described with regard to FIG. 1. The transparent inflatable body 140 is attached to the attachment means 150 and surrounds the surface 210 sealingly. This inflatable airlock 135 comprises two inflatable protuberances 145 allowing an operator's hands to be inserted inside the volume of the inflatable airlock 135 when this airlock 135 is inflated.

The means 155 for attaching a cap 160 and the cap 160 are placed inside the inflatable airlock 135 before the inflatable airlock 135 is attached to the flange 105.

The flange 105 comprises a valve 165 passing through the lower portion 115 of the flange 105 and allowing the inflatable airlock 135 to be inflated by inserting air or fluid into the volume of the inflatable airlock 135.

In some variants, the device 10 comprises a means for checking that the inflatable airlock 135 is sealed. This verification means is, for example, a cylinder of a fluid, this fluid moving when coming into contact with a leak at an unsealed junction of the device 10.

In some embodiments (not shown), the device that is the subject of the present invention comprises two flanges and a cylindrical inflatable airlock attached to each flange to surround a conduit to be dealt with. This device makes it possible to change a seal on a conduit, for example. In the same way as devices 10 and 30, the tools and parts required to carry out an intervention on a conduit are inserted into the airlock before the airlock is inflated, and the airlock comprises protuberances allowing operators' hands to be inserted to carry out the intervention.

Figure 3:
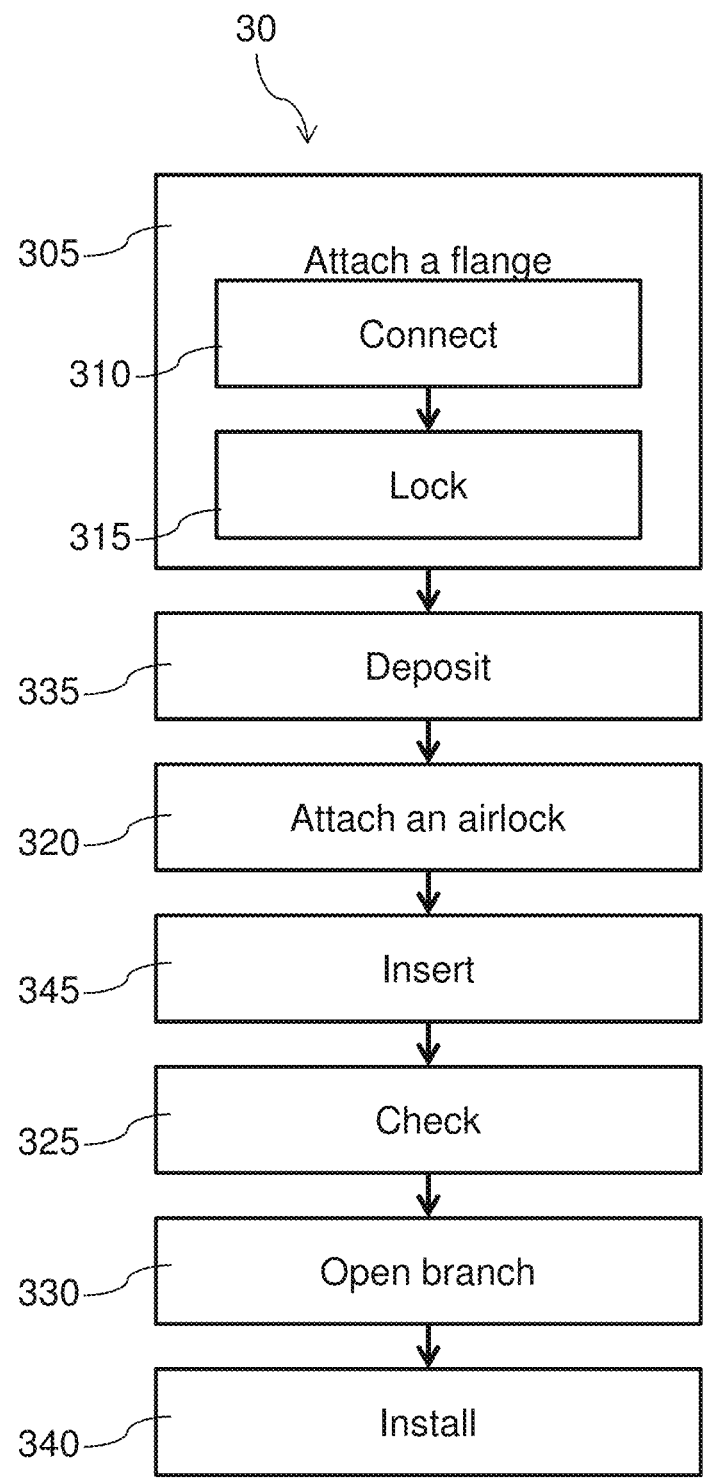
FIG. 3 represents, in the form of a logical diagram, steps in a particular embodiment of the method that is the subject of the present invention.

FIG. 3 shows, in the form of a logical diagram, steps in a particular embodiment of the method 30 that is the subject of the present invention. This method 30 for intervening on a branch 221 of a fluid conduit comprises:
- a step 305 of attaching a removable flange, comprising:
  - a step 310 of connecting two portions linked by a removable junction having, when the two portions are linked, an opening surrounding the branch 221; and
  - a step 315 of locking the flange around the branch 221 such that the opening sealingly surrounds the branch 221;
- a step 335 of depositing a cap and a means for attaching the cap closing an opening of the branch 221 inside an inflatable airlock comprising an inflatable body having two inflatable protuberances;
- a step 320 of sealingly attaching the inflatable airlock to the flange;
- a step 345 of inserting pressurized air through a valve passing through the flange to bring the pressure of the airlock below the pressure of the fluid in the conduit;
- a step 325 of checking that the airlock is sealed by inflating the airlock;
- a step 330 of opening the branch 221; and
- a step 340 of installing the cap over the opening of the branch 221.

The step 310 of connecting the two portions is performed, for example, by an operator positioning the two portions of the flange either side of a conduit of a branch 221 of a fluid pipe. This positioning is performed, for example, along a cross-sectional plane orthogonal to a main axis of the conduit. During this connection step 310, an opening of the flange is positioned around the conduit.

The step 315 of locking the flange is performed, for example, by utilizing screws and nuts passing through a set of threaded holes positioned on each portion of the flange opposite each other once the connection step 310 is performed. These screws and nuts make it possible to secure the position of the flange and to seal the junction between the opening of the flange and the conduit.

The deposit step 335 is performed, for example, by an operator placing the means for attaching a cap and the cap inside the volume of the inflatable airlock.

The step 320 of sealingly attaching the inflatable airlock to the flange is performed, for example, by utilizing clips positioned on a rigid frame of the inflatable airlock and spurs positioned in the flange opposite the clips. In this way, during a rotation of the rigid frame of the inflatable airlock relative to the flange, once these two elements are opposite, the clips are secured to the spurs.

The step 345 of inserting pressurized air is performed, for example, by utilizing an air pump inserting air into the interior volume of the inflatable airlock, once this inflatable airlock is secured, by means of the valve passing through the flange.

The step 325 of checking that the airlock is sealed is performed, for example, by utilizing a liquid on a presumed location of a leak, this liquid being traversed by bubbles of fluid if there is leakage.

The airlock inflation step 330 is performed by the means utilized during the step 345 of inserting pressurized air.

The step 330 of opening the branch 221 is performed, for example, by an operator inserting his hands through protuberances of the inflatable airlock to unscrew a cap covering the opening of the branch 221.

The installation step 340 is performed, for example, by an operator placing his hands through protuberances of the inflatable airlock to position the cap and to attach this cap using the means for attaching the cap.

Once steps 305 to 340 have all been performed, the operator removes the airlock and then the flange, and stores the remaining parts and tools away.

The invention claimed is:

1. A device for intervening on a branch of a fluid conduit, comprising:
    a removable flange comprising:
        two portions linked by a removable junction having, when the two portions are linked, an opening surrounding a branch; and
        a locking means for locking the flange around the branch such that the opening sealingly surrounds the branch;
    an inflatable airlock comprising:
        an inflatable body having at least one inflatable protuberance; and
        a means for sealed attachment to the flange.

2. The device according to claim 1, further comprising a means for attaching a cap closing an opening of the branch, the cap and the attachment means being positioned in the inflatable airlock before the airlock is attached to the flange.

3. The device according to claim 1, wherein the flange comprises a valve passing through one portion of the flange to inflate or empty the inflatable airlock when the valve is open.

4. The device according to claim 3, which comprises a means for inserting pressurized air into the inflatable airlock at a pressure lower than or equal to the pressure of the fluid of the conduit.

5. The device according to claim 3, wherein the airlock is inflated to a pressure lower than or equal to 50 mbar.

6. The device according to claim 1, wherein the locking means comprises a means for clamping one portion of the flange to the other portion.

7. The device according to claim 1, wherein the inflatable airlock is transparent.

8. The device according to claim 1, wherein the flange comprises a rigid base for parts and/or tools for the intervention.

9. A method for intervening on a branch of a fluid conduit, comprising:
    a step of attaching a removable flange, comprising:
        a step of connecting two portions linked by a removable junction having, when the two portions are linked, an opening surrounding the branch; and
        a step of locking the flange around the branch such that the opening sealingly surrounds the branch;
    a step of sealingly attaching an inflatable airlock to the flange;
    a step of opening the branch.

10. The method according to claim 9, which comprises a step of checking that the airlock is sealed, achieved by inflating the airlock.

11. The method according to claim 9, for removing the branch, which comprises:
    before the step of attaching the airlock, a step of depositing a cap and a means for attaching the cap closing an opening of the branch inside the inflatable airlock comprising an inflatable body having two inflatable protuberances; and,
    before the opening step, a step of installing the cap over the opening of the branch.

12. The method according to claim 9, which comprises a step of inserting pressurized air through a valve passing through the flange to bring the pressure of the airlock below the pressure of the fluid in the conduit.

* * * * *